(12) United States Patent
Turner et al.

(10) Patent No.: US 8,393,038 B2
(45) Date of Patent: Mar. 12, 2013

(54) ANGULAR TRAVEL RESTRAINT FOR WRAPAROUND BRUSH

(75) Inventors: Barry S. Turner, Novi, MI (US); Thomas E. Weyandt, Northville, MI (US); Curtis S. Prater, Warren, MI (US)

(73) Assignee: Belanger, Inc., Northville, MI (US)

( * ) Notice: Subject to any disclaimer, the term of this patent is extended or adjusted under 35 U.S.C. 154(b) by 626 days.

(21) Appl. No.: 12/626,181

(22) Filed: Nov. 25, 2009

(65) Prior Publication Data

US 2011/0119844 A1    May 26, 2011

(51) Int. Cl.
*B60S 3/06* (2006.01)

(52) U.S. Cl. ......... 15/53.2; 15/53.3; 15/97.3; 15/DIG. 2

(58) Field of Classification Search .................. 15/53.1, 15/53.2, 53.3, 97.3, DIG. 2
See application file for complete search history.

(56) References Cited

U.S. PATENT DOCUMENTS

| | | | |
|---|---|---|---|
| 4,962,560 A * | 10/1990 | Moore | 15/53.3 |
| 5,709,002 A | 1/1998 | Belanger et al. | |
| 5,813,077 A * | 9/1998 | Belanger et al. | 15/97.3 |
| 6,427,277 B1 | 8/2002 | Ennis | |
| 7,168,123 B2 | 1/2007 | Ennis | |
| 7,506,394 B2 | 3/2009 | Prater et al. | |

* cited by examiner

*Primary Examiner* — Randall Chin
(74) *Attorney, Agent, or Firm* — Young Basile Hanlon & MacFarlane PC

(57) ABSTRACT

A car wash brush comprising a motor and a rotatable vertically-depending brush shaft is provided with a spherical bearing which allows universal swivel movement of the brush shaft away from a normal, essentially vertical orientation. To limit the degree of swivel permitted, a plate with three angularly spaced bumpers is attached to the top of the swivel bearing and a C-shaped stop plate is arranged on a brush mount over the bumpers in fixed spaced relationship to the bearing seat such that excessive swivel motion brings one or more of the bumpers into contact with the under surface of the C-shaped plate. The bearing support structure is attached to a swing arm by means of an extra pivot which provides a breakaway function. An alarm and/or event recorder is provided to trigger an inspection in the event the breakaway function is brought into play.

14 Claims, 5 Drawing Sheets

ANGULAR TRAVEL RESTRAINT FOR WRAPAROUND BRUSH

FIELD OF THE INVENTION

This invention relates to car wash brush assemblies and more particularly to a vertical brush, often used in "wraparound" pairs, of the type in which a vertical brush is supported by a spherical bearing seated in a brush mount to provide for angular swinging motion of the brush shaft, a restraint is provided to limit the degree of such motion, and a secondary joint is provided between the brush support arm and the brush mount to allow the entirety of the brush and mount to swing beyond the restraint limits in the event of a brush-vehicle collision.

BACKGROUND OF THE INVENTION

U.S. Pat. No. 5,709,002 issued Jan. 20, 1998 and assigned to Belanger, Inc. of Northville, Mich. discloses a vertical car wash brush having a spherical bearing which permits essentially universal swinging motion of the brush shaft axis during contact with the surfaces of a vehicle. The term "vertical" is used herein to distinguish from "horizontal" brushes with contact horizontal surfaces such as hoods and roofs, and means that the shaft axis is substantially vertical when the brush is at rest. Vertical brushes are used both singly and in wraparound pairs to engage the front, side and rear surfaces of automobiles as they pass through a car wash system.

SUMMARY OF THE INVENTION

The present invention is based on the discovery that while it is generally desirable to employ a mechanical restraint which limits the degree to which a vertical brush is allowed to swing, there is a further advantage in providing a secondary pivot joint in the connection between the brush mount and the arm which supports the brush and allows it to move laterally relative to a vehicle and/or a mating brush in a wraparound pair. This pivot is oriented such as to allow the combination of the brush shaft, motor, bearing and brush mount to pivot well beyond the limit imposed by the swing restraint in a direction which prevents damage in the event a vehicle collides with the brush in a way that would otherwise cause damage to the brush system and/or the vehicle.

Accordingly, the invention combination provides a multi-directional swing limiter for a vertical car wash brush having a swivel bearing near the top of the brush shaft. In general, the device is shown herein used in a brush construction having a spherical swivel bearing and comprises a brush mount with a stop member and a bearing with one or more circumferentially-spaced bumpers which can contact the stop member at the limit of allowable angular displacement or "swing" of the brush axis from the rest position.

The preferred embodiment uses a C-shaped stop member opening toward a vehicle during normal brush operation. The bumpers are located on a plate attached to the top of the spherical brush bearing but under the stop member such that tipping of the bearing plate causes one or more of the bumpers to contact the underside of the stop member. In the preferred embodiment, the bumper mounting plate has three radially outwardly projecting ears which locate at least one of the bumpers between vertical spacers on the bearing mount to provide an "anti-spin" function hereinafter explained.

In addition to the swing limiter described above, the brush mount is attached to a support arm by means of an "extra" or secondary pivot which provides a breakaway function to permit the entire brush assembly, along with the brush bearing and mount, to pivot up and out in the event of a potentially damaging condition caused, for example, by a malfunction which results in a collision between a vehicle and the car wash brush which would damage the brush by, for example, bending the brush shaft.

The brush and bearing system of the present invention is typically found in a car wash in wraparound pairs mounted on respective horizontal pivot aims which extend outwardly from support structures to wash the front and rear surfaces of the vehicle in concert, but to separate or spread apart as the vehicle moves forward to wash respective sides of the vehicle, one side to each brush.

In accordance with a still and more specific aspect of the invention, an event alarm or recorder is combined with the breakaway function to signal and/or make a record of the breakaway event, thereby calling the operator's attention to the possibility that the car wash brush system has suffered damage and requires either adjustment or repair.

BRIEF DESCRIPTION OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
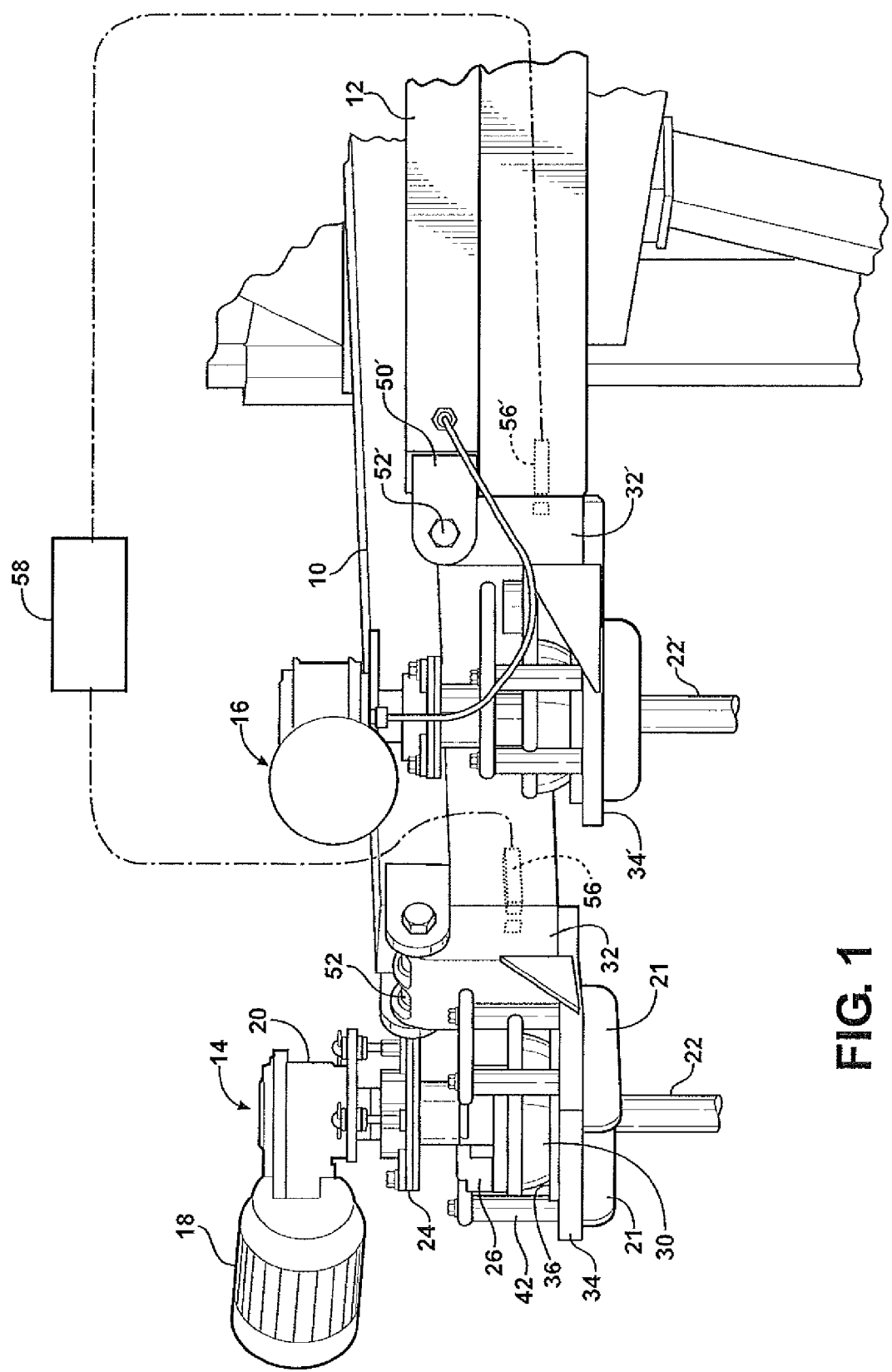
FIG. 1 is a partial side view of a car wash brush system having two vertical brushes mounted on respective pivot arms wherein each brush has a swivel bearing and a restraint system according to the present invention.

Referring to the drawings, FIG. 1 shows the top or "head" portion of a car wash vertical wraparound brush system comprising brush support arms 10, 12 carrying brush assemblies 14 and 16, respectively. The arms 10, 12 are connected to supports installed in the car wash (not shown) in such a way as to permit the brush assemblies 14, 16 to move from a position in which they are close together, to a second, farther apart position to wrap around a vehicle passing between them and wash the front, side and rear surfaces thereof. The actual brush structures, apart from the shafts 22, 22' are eliminated from the drawings for space conservation but are shown in full in the aforementioned U.S. Pat. No. 5,709,002, the entire contents of which are incorporated herein by reference.

Brush assemblies 14, 16 are essentially identical and the components thereof are labeled with corresponding reference numbers, the numbers for the brush assembly 16 being "primed". Brush assembly 14, as shown in FIGS. 1-5, comprises a motor 18, a gear box 20, a brush shaft 22 and a hemispherical urethane bearing surrounding the shaft 22. A brush mount 34 includes an annular seat 36 which receives the bearing 30 therein and allows swinging, pendulum motion of the brush shaft 22 in all directions. As described in the aforementioned U.S. Pat. No. 5,709,002, the lower brush structure (not shown here but fully shown in the '002 patent)

on the shaft 22 has a higher moment of inertia than the motor 18 and other structure above the bearing center such that the entire assembly 14 is stable and will return to a substantially vertical rest position when no external forces are applied to the brush such as by contact with a moving vehicle.

Figure 2:
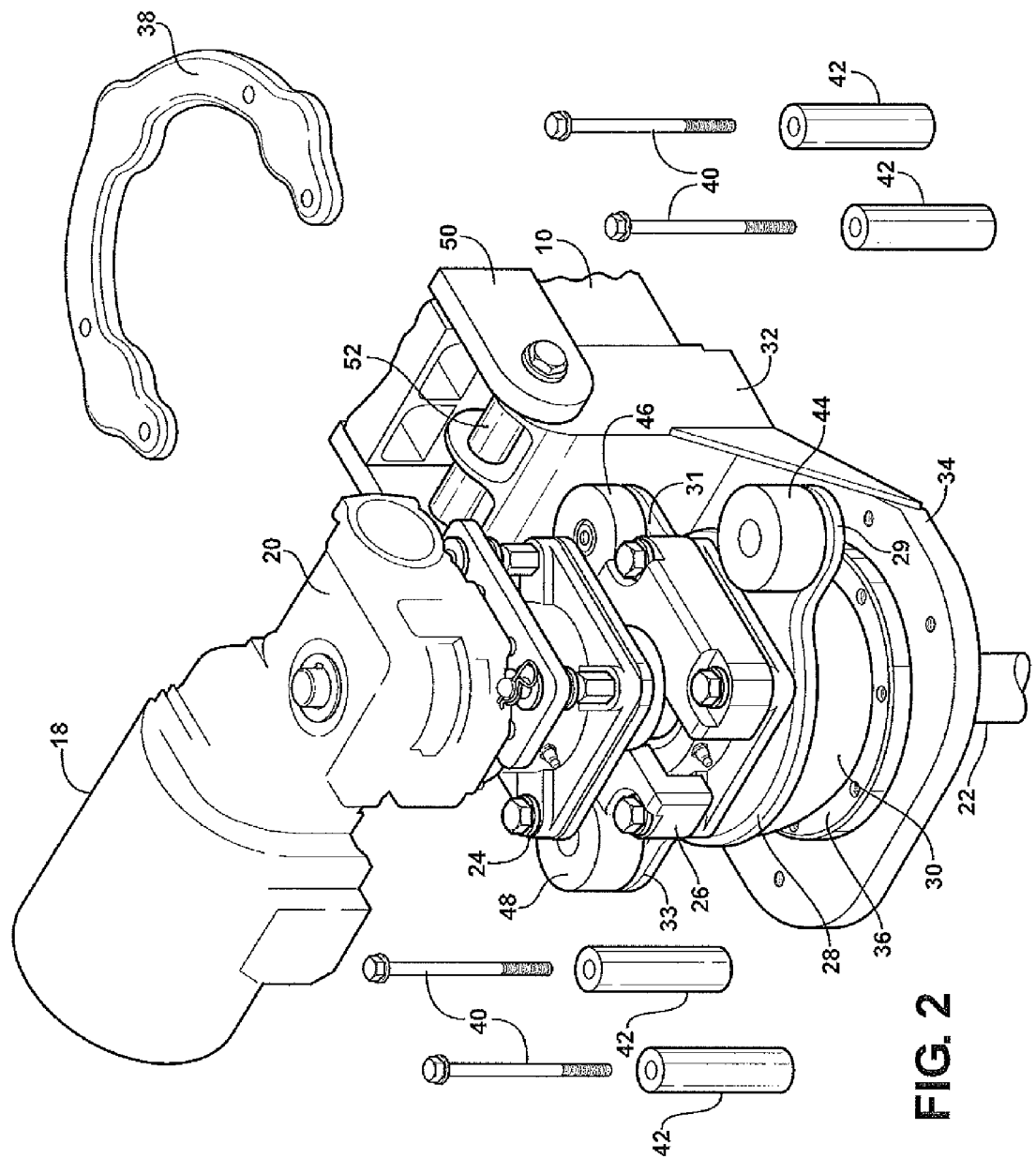
FIG. 2 is a perspective view of one of the brush pivot assemblies from the combination of FIG. 1 with certain parts exploded for clarity.
Figure 4:
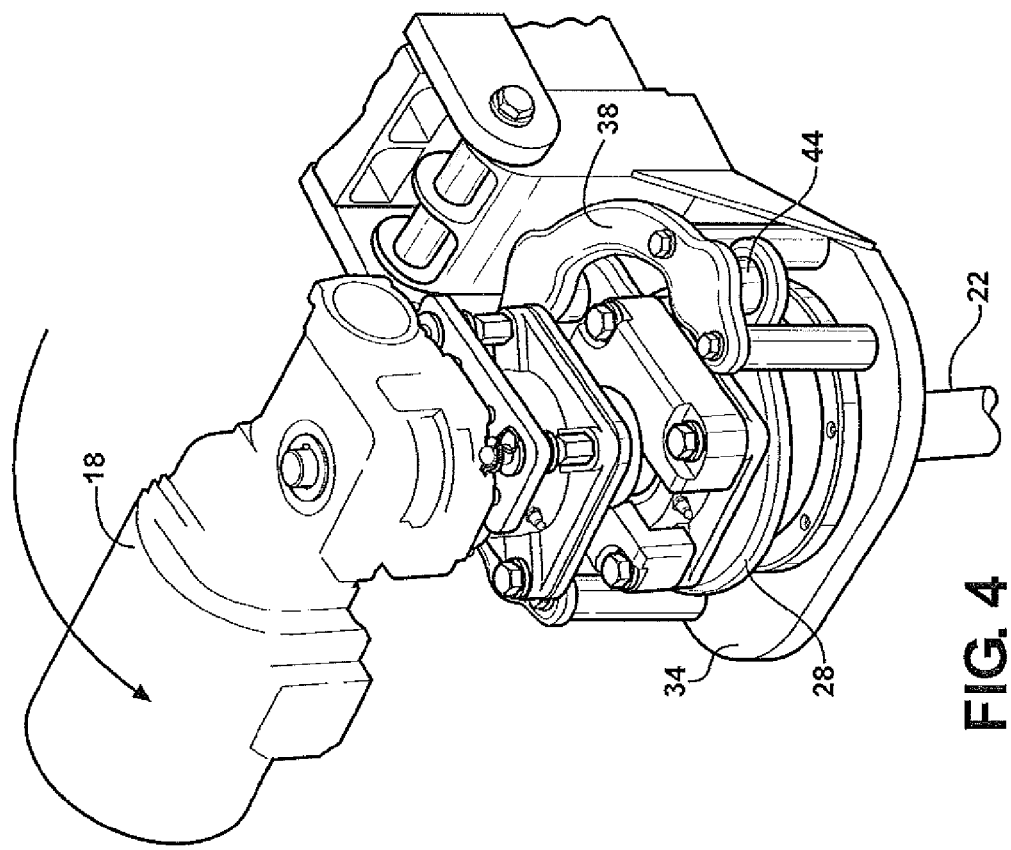
FIG. 4 is a perspective view of the assembly of FIG. 2 in a second shaft angular position.
Figure 3:
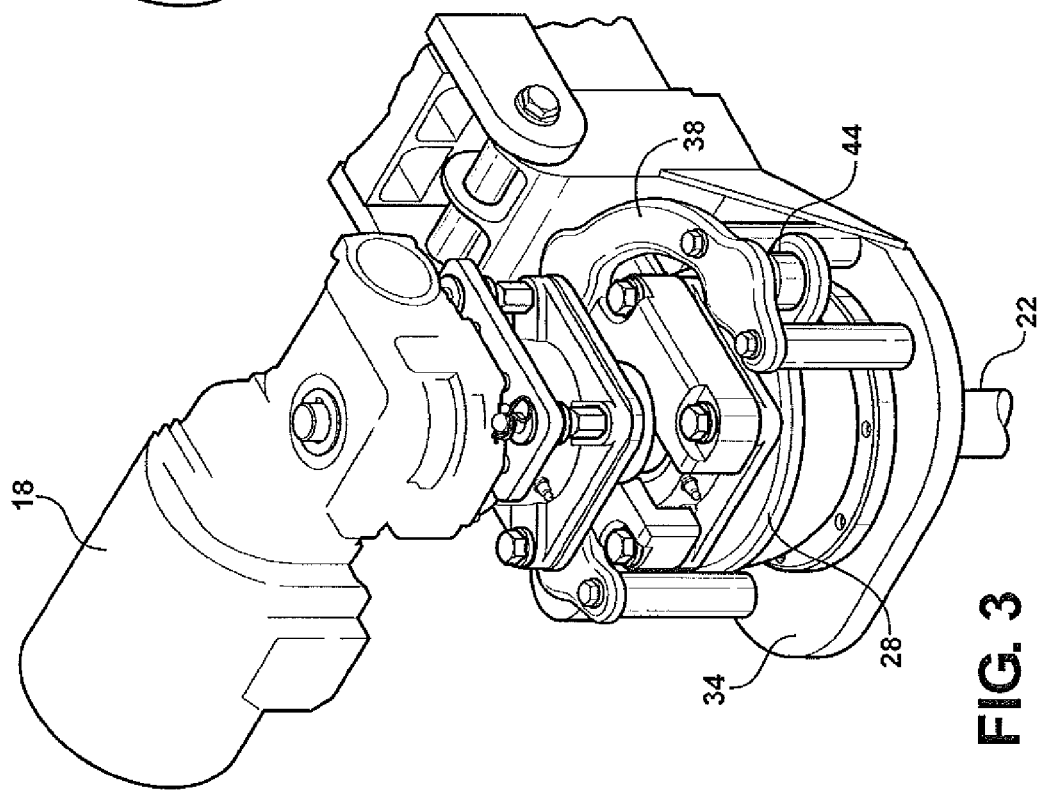
FIG. 3 is a perspective view of the assembly of FIG. 2 in a first shaft angular position.
Figure 5:
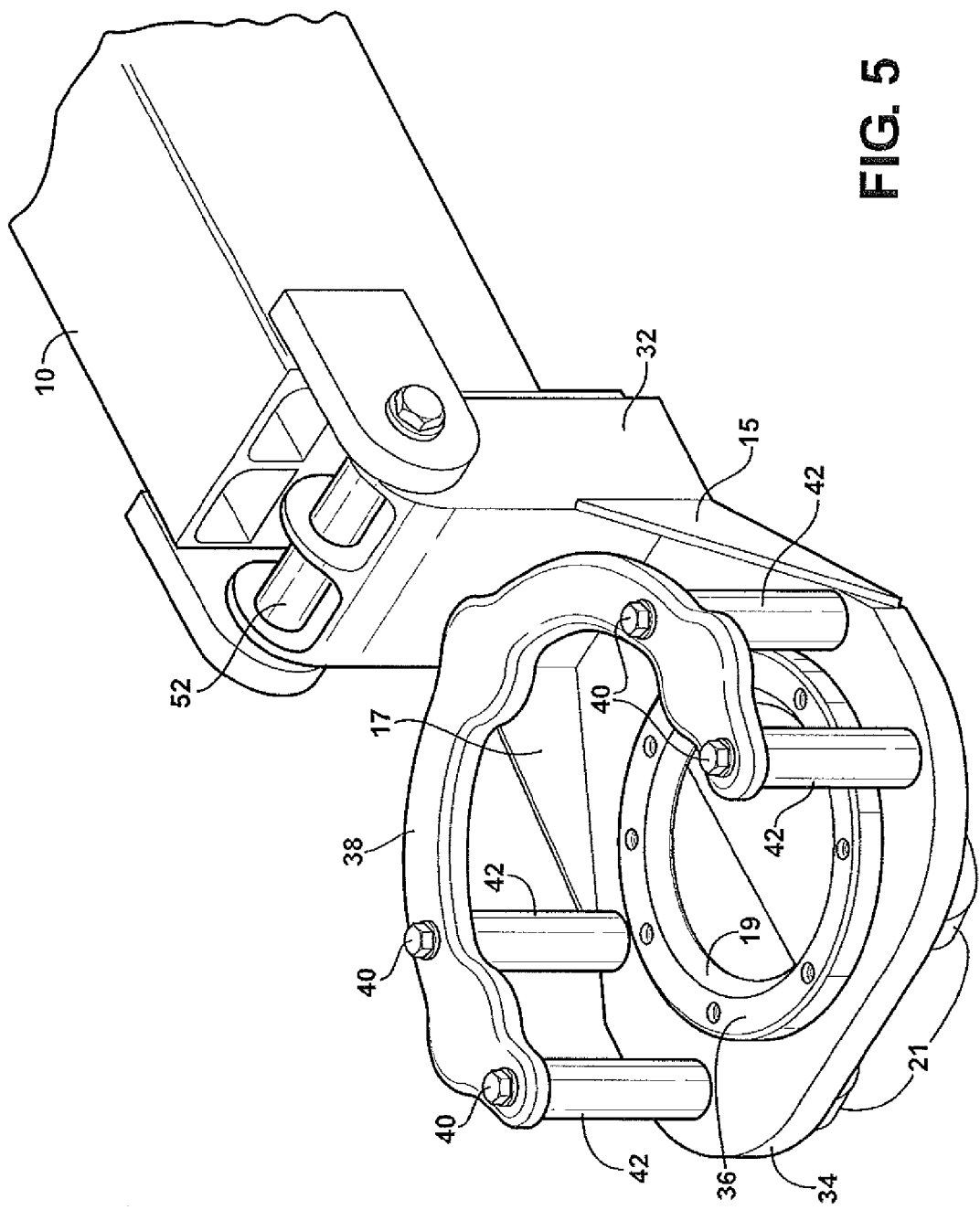
FIG. 5 is a perspective view of the brush mount alone.

As best shown in FIGS. 2 and 5, the brush mount 34 comprises a large metal plate which is welded to a short, hollow aluminum beam 32 connected by means of a pivot 52 to the end of the arm 10. Plates 15, 17 are welded between the mount 34 and the beam 32 for strength and rigidity. An annular seat 36 of UHMW (ultra-high molecular weight polyethylene) is bolted to the mount 34 to receive the bearing 30 in contact with the conical surface 19 to permit the assembly 14 to swing in all directions. Ribs 21 may be welded to the bottom of mount plate 34 for additional strength.

A C-shaped stop plate 38 is mounted to but in upwardly spaced relationship to the mount plate 34 by means of bolts 40 and spacers 42. The spacers 42 also provide an "anti-spin" function as hereinafter explained.

It will be apparent from the foregoing that, apart from a "breakaway" function permitted by the pivots 52 and 52' and the movement provided by arms 10, 12, the brush mounts 34 and 34' shown in FIGS. 1 and 5 are essentially fixed in spatial orientation, and maintain their orientations as the arms 10 and 12 move during a vehicle wash cycle. The brush assembly 14, including bearing 30, sits on the seat 36 and swivels as necessary to allow a rotating brush on shaft 22 to maintain contact with a vehicle passing through a car wash on, for example, a conveyor track. Similarly, assembly 16 sits on an identical structure 34' to swivel as necessary.

The description turns now to the details of the brush assembly 14, with the understanding that it is identical to assembly 16 on the end of arm 12.

Figure 6:
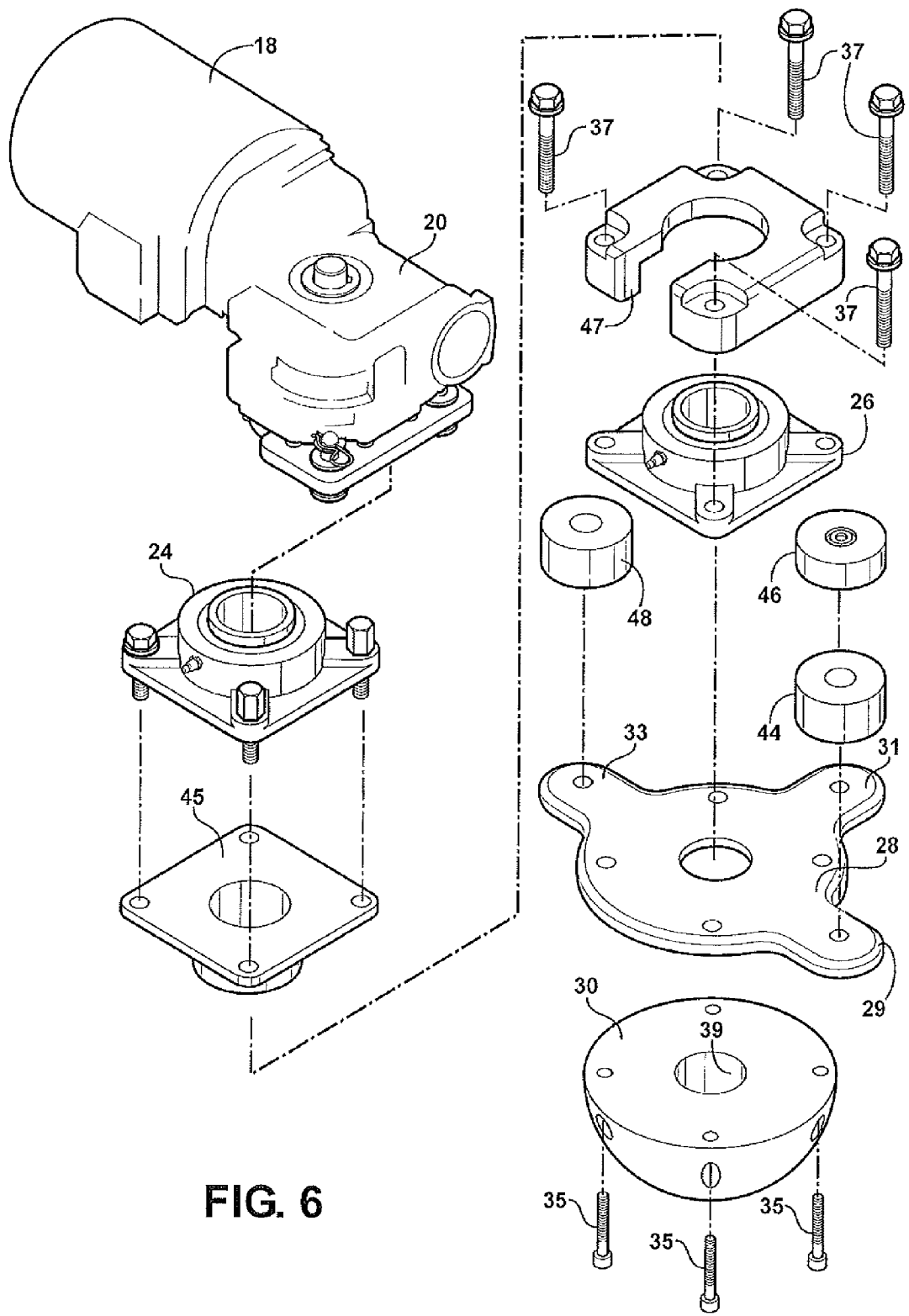
FIG. 6 is an exploded view of the assembly of FIG. 2 minus the bearing seat and the C-shaped stop member.

Shaft 22 is supported for rotation by upper bearing 24 and lower bearing 26, both of which have conventional grease fittings. Plates 45 and 47 complete the shaft bearing assembly and are provided with holes to receive bolts 37 as best shown in FIG. 6.

A plate 28 with three spaced ears 29, 31, 33 is mounted to the top surface of the urethane hemispherical bearing 30 to swivel therewith. Elastomeric, puck-shaped bumpers 44, 46, 48 are bolted to the ears 29, 31, 33 respectively by bolts 35. Center hole 39 in bearing accommodates the shaft 22.

Ears 29, 33 extend outwardly between spacer pairs 42 and the bumpers 44, 48 carried thereby bear against the spacers 42 to prevent reaction torque from spinning the assembly 14 in the seat 36 around the brush shaft axis. In addition, bumpers 44, 46, 48 will bear against the undersurface of the stop plate 38 to limit the degree to which the assembly 14 can swivel in the seat 36 of the mount 34.

It will be apparent that the restraint provided by interfering contact between the bumpers 44, 46, 48 and the C-shaped stop plate 38 is not completely universal; i.e., it does not extend fully around the 360° swivel capability of the shaft 22 provided by the universal swivel bearing 30, 36. In this regard, the opening of the C-shaped stop plate 38 is arranged so as to face a vehicle which is being contacted by the brush on shaft 22. The vehicle itself, thus, provides restraint in the direction of the opening of the C-shaped plate 38.

As discussed above, the brush assemblies 14, 16 are typically provided in pairs and are arranged in FIG. 1 so that a vehicle to be washed by the brush assemblies 14, 16 approaches the assemblies from right to left as shown in FIG. 1. To accommodate a potentially brush-damaging situation caused by, for example, an overspeed condition of the contacting vehicle relative to the brush assemblies 14, 16, or a malfunction which prevents arms 10, 12 from separating to allow the vehicle to pass between the brushes, a breakaway function is provided by pivots 52, 52' between the structures 34, 34' and the respective brush support arms 10, 12. Looking specifically to brush assembly 14, the pivot 52 permits the short vertical beam 32 along with the bearing mount plate 34 to lift and pivot away from the beam 10 and support bracket 50, limited only by the inertia of the brush assembly itself. This breakaway function may prevent bending or breaking of brush shafts and/or damage to other components. Apart from this breakaway function, the pivot 52 does not come into play. The pivot 52 must be oriented crosswise relative to the path of vehicle travel toward the brushes.

To alert the operator of the car wash system and/or to actually record an event which causes operation to the breakaway feature provided by pivots 52 and 52', limit switches 56, 56' are provided in association with the support arms 10, 12 respectively and are connected to an alarm/event recorder 58 to either trigger an alarm device such as a bell or light and/or to make an electronic record of the time of the breakaway event such that the car wash operator may make a timely inspection and any adjustments or repairs that may be necessitated. To prevent spurious alarm signals, a delay feature may be incorporated into the event recorded such that the alarm is only triggered and/or the event is only recorded if the pivot is activated for more than a predetermined time period.

It will be appreciated that while the invention has been described with reference to an illustrative embodiment, not all structural components of the system need be constructed in the form shown and that sizes and materials vary to suit the particular application.

Moreover while the invention works in particular advantage with a spherical bearing allowing universal swivel movement of a car wash brush, other bearing arrangements may also be used and the stop function componentry adjusted as necessary to accommodate the swivel action which is afforded.

What is claimed is:

1. A car wash system comprising a support arm, a brush assembly mounted to the arm and having a drive head and a drive shaft depending from the drive head wherein the improvement comprises:
   a brush mount including a bearing seat; a bearing fixed to the drive head and resting in the seat to allow the shaft to swing;
   a swing-limiting stop member connected to the brush mount so that part of the drive head contacts said stop member when said drive shaft swings through a predetermined angle to restrain further angular travel thereof; and
   a breakaway pivot between the brush mount and the support arm.

2. A car wash system as described in claim 1 wherein the bearing is configured to allow universal swiveling.

3. A car wash system as described in claim 2 further comprising a plurality of angularly spaced bumpers mounted to said bearing so that at least one of said bumpers contacts said stop member when the shaft swings through said predetermined angler.

4. A car wash system as described in claim 2 further comprising a spin stop to prevent reaction torque from turning the drive head relative to the brush mount.

5. A car wash system as described in claim 4 wherein the spin stop is mechanically integrated with said stop member.

6. A car wash system as described in claim 2 wherein said stop member is C-shaped and is located above the bearing seat.

7. A car wash system as described in claim 6 wherein said C-shaped stop member is mounted on spacer posts in surrounding relationship to said swivel bearing and said drive shaft.

8. A car wash system as described in claim 1 wherein said drive head comprises a drive motor mounted above said bearing and at least one drive shaft bearing to provide for rotation of said drive shaft by said motor.

9. A car wash system as described in claim 1 further comprising means for providing an indication when said pivot has been activated.

10. A car wash system as described in claim 9 wherein said means for providing an indication comprises a limit switch connected between the support arm and the brush mount for producing an electrical signal when said breakaway pivot is activated.

11. A car wash brush structure comprising:

a support arm;

a brush mount including a universal bearing seat;

a brush motor and shaft having a swivel bearing disposed in said seat; and a horizontal breakaway pivot connecting said support arm to said brush mount to allow said mount, motor and shaft to swing as a result of a potentially damaging vehicle-brush collision.

12. A car wash brush structure as defined in claim 11 further including means for preventing reaction torque from rotating said brush motor relative to said seat.

13. A car wash brush structure as defined in claim 11 further including an alarm switch connected to said pivot to produce a signal when the pivot is activated.

14. A car wash brush comprising:

a bearing seat;

a bearing mounted in said seat;

a plurality of bumper stops mounted in circumferentially spaced relationship to said bearing;

a stop plate mounted to said bearing seat in spaced relationship to said bumper stops but proximate to said stops to be contacted in interfering relation therewith whenever said bearing pivots relative to said seat;

said brush further comprising a brush drive motor mounted above said bearing seat and having a shaft extending through said bearing and bearing seat; and a car wash brush mounted to said shaft below said bearing seat; said brush further comprising a support arm and a breakaway pivot connecting said support arm to said brush to provide for a breakaway pivotal displacement of said brush in the event of a collision with a vehicle.

\* \* \* \* \*